(12) United States Patent
Shincho et al.

(10) Patent No.: US 7,267,160 B2
(45) Date of Patent: Sep. 11, 2007

(54) HEAT EXCHANGER

(75) Inventors: Shuko Shincho, Hadano (JP); Susumu Ichikawa, Hadano (JP); Masaki Saito, Hadano (JP); Tadamichi Aoyama, Hadano (JP)

(73) Assignee: T.RAD Co., Ltd., Tokyo (JP)

( * ) Notice: Subject to any disclaimer, the term of this patent is extended or adjusted under 35 U.S.C. 154(b) by 453 days.

(21) Appl. No.: 10/521,819

(22) PCT Filed: Jul. 23, 2003

(86) PCT No.: PCT/JP03/09327

§ 371 (c)(1),
(2), (4) Date: Feb. 1, 2005

(87) PCT Pub. No.: WO2004/011869

PCT Pub. Date: Feb. 5, 2004

(65) Prior Publication Data

US 2006/0102321 A1    May 18, 2006

(30) Foreign Application Priority Data

Jul. 25, 2002    (JP) .............................. 2002-217202

(51) Int. Cl.
*F28D 7/10* (2006.01)
*F28F 9/22* (2006.01)

(52) U.S. Cl. ..................................................... 165/83

(58) Field of Classification Search ................. 165/81, 165/82, 83, 159, 160, 161
See application file for complete search history.

(56) References Cited

U.S. PATENT DOCUMENTS

| | | | | |
|---|---|---|---|---|
| 1,338,479 A | * | 4/1920 | Zimmermann | 165/161 |
| 1,891,607 A | * | 12/1932 | Rainey | 165/67 |
| 1,926,494 A | * | 9/1933 | Morterud | 165/160 |
| 1,942,878 A | * | 1/1934 | Reed | 165/161 |
| 1,962,362 A | * | 6/1934 | Reed | 165/161 |
| 2,181,486 A | * | 11/1939 | Jenkins | 165/70 |
| 2,517,169 A | * | 8/1950 | Bennett | 165/161 |
| 3,173,481 A | * | 3/1965 | Barkley | 165/160 |
| 3,732,922 A | * | 5/1973 | Pouderoux | 165/158 |

(Continued)

FOREIGN PATENT DOCUMENTS

JP    62-22994    1/1987

(Continued)

*Primary Examiner*—Allen J. Flanigan
(74) *Attorney, Agent, or Firm*—Jordan and Hamburg LLP

(57) ABSTRACT

In order to provide a heat exchanger with casing having a multiplicity of tubes through the interiors of which a high-temperature gas for heating flows, wherein the thermal stress is smoothly accommodated and wherein a fluid to be heated or a heating fluid flows uniformly through the outsides of the tubes, a multiplicity of flat tubes are joined at their opposed ends to a pair of discoidal tube plates, the outer periphery of the flat tubes being enclosed by an inner cylinder having a rectangular cross-section except the opposed end portions of the flat tubes, with a pair of baffle plates being disposed at the opposed ends of the inner cylinder. The pair of baffle plates are covered with an circular outer cylinder having a corrugated portion that is thermally expandable, with an inlet and an outlet for the fluid to be heated or the heating fluid positioned between the pair of baffle plates and the tube plates.

2 Claims, 5 Drawing Sheets

U.S. PATENT DOCUMENTS

| | | | | |
|---|---|---|---|---|
| 3,822,741 | A | * | 7/1974 | Lippitsch ................... 165/83 |
| 4,249,596 | A | * | 2/1981 | Tutak et al. ............... 165/113 |
| 4,585,053 | A | * | 4/1986 | Kaufman et al. ........... 165/74 |
| RE33,528 | E | * | 1/1991 | Doty .......................... 165/158 |
| 5,871,045 | A | * | 2/1999 | Hirth et al. ................ 165/160 |
| 2004/0182547 | A1 | * | 9/2004 | Birkert et al. ............... 165/83 |

FOREIGN PATENT DOCUMENTS

| JP | 2002-80203 | 3/2002 |
|---|---|---|
| JP | 2002-107091 | 4/2002 |

* cited by examiner

HEAT EXCHANGER

TECHNICAL FIELD

The present invention relates to a heat exchanger for high temperature used in a fuel cell reformer, etc.

BACKGROUND ART

In a fuel cell using hydrogen and oxygen as its fuel, the hydrogen is generated by a reformer in the form of a high-temperature-use heat exchanger. The reformer acts to deliver hydrocarbon such as methanol and steam into a catalyst and applies thereto external heat to generate hydrogen.

Examples of such a heat exchanger for the reformer include one disclosed in Japanese Patent Application Laid-Open Publication No. 2002-80203. This is arranged such that a multiplicity of juxtaposed flat tubes are joined at their respective opposed ends to square tube plates in an gas tight manner to form a core, with the tube plates in a pair being connected to each other by a square-in-section casing. The casing is provided at peripheries around one end and the other end thereof in the longitudinal direction, respectively, with an inlet for a reforming material and an outlet for a reforming gas, with an inlet tank and an outlet tank for a combustion gas being disposed around the peripheries of the tube plates. A bellows-like square-in-section cylinder is interposed between the casing and the tube plates so as to relax a thermal stress occurring between the tubes and the casing.

Due to its square cross-section, however, the square-in-section of bellows-like thermal stress relaxation means tend to suffer from a drawback of being hard to smoothly stretch in its axial direction. In addition, its fabrication is not easy. Mere forming of a cylindrical casing would not allow a fluid to be heated to pass uniformly through parts of the core.

It is therefore the object of the present invention to overcome the above drawbacks.

DISCLOSURE OF THE INVENTION

The present invention of claim 1 provides a heat exchanger comprising:

a core (4) in the aggregate of a multiplicity of juxtaposed flat tubes (3), with a heating fluid (1) flowing through one of the inside and the outside of the flat tubes (3), with a fluid to be heated (2) flowing through the other;

a pair of discoidal tube plates (5) including tube insertion apertures to which the flat tubes (3) are jointed at their respective opposed ends;

an inner cylinder (6) having a rectangular cross-section enclosing the outer periphery of the core (4) except the vicinities of the pair of tube plates (5);

a first baffle plate (7) having a circular periphery fitted to the outer periphery at one end of the inner cylinder (6), the first baffle plate (7) confronting one of the pair of tube plates (5);

a circular outer cylinder (10) having one end joined to the first baffle plate (7) and the other end joined to a second baffle plate (8) with a circular periphery disposed on the outer periphery at the other end of the inner cylinder (6) or to the other of the pair of tube plates (5), the outer cylinder (10) including on its outer periphery a corrugated portion that is thermally expandable in the axial direction; and an outlet (11) and an inlet (12) for the fluid to be heated (2) or the heating fluid (1) disposed at the both end portions of the core (4) between the opposed ends of the inner cylinder (6) and the pair of tube plates (5), wherein a lead-in port (13) and a lead-out port (14) for the heating fluid (1) or the fluid to be heated (2) are connected respectively to the pair of tube plates (5).

The present invention of claim 2 provide the heat exchanger of claim 1, wherein the second baffle plate (8) having the circular outer periphery is fitted at its rectangular inner periphery to the outer periphery at the other end of the inner cylinder (6) in such a manner as to be slightly displaceable in the axial direction of the inner cylinder (6) confronting the other of the pair of tube plates (5), wherein the outer cylinder (10) is firmly connected at the other end thereof to the outer periphery of the second baffle plate (8), wherein the first baffle plate (7) is fitted at its rectangular inner periphery to the outer periphery at one end of the inner cylinder (6) with the first baffle plate (7) being secured to the outer cylinder (10), and wherein the heat exchanger further comprises a first (15) and a second (16) cylindrical tank bodies whose opposed ends are firmly connected respectively to the tube plates (5) and to the first (7) and the second (8) baffle plates confronting the tube plates (5).

The heat exchanger of the present invention has the above constitution and the following advantages. That is, at least one first baffle plate 7 is fitted to the outer periphery at one end of the inner cylinder 6, with the outlet 11 and inlet 12 for the fluid to be heated and the heating fluid being positioned between the opposed ends of the inner cylinder 6 and the tube plates 5, the outer cylinder 10 being formed into a circular cylinder with the inner cylinder 6 being of a rectangular cross-section that encloses the outer periphery of the core 4. The presence of the first baffle plate 7 enables the fluid 2 to be heated or the heating fluid 1 to securely be delivered to the interior of the inner cylinder 6 to ensure a uniform heat exchange at respective parts. The fluid 2 to be heated or the heating fluid 1 can thus be prevented from flowing through the space defined between the inner tube 6 and the first baffle plate 7.

Since the outer cylinder 10 is formed into a circular cylinder whose outer periphery is provided with the corrugated portion 9 that is thermally expandable in the axial direction, its fabrication and expansion and contraction attendant on the thermal expansion become easy, achieving a high durability.

The second baffle plate 8 is fitted at its rectangular inner periphery to the inner cylinder 6 such that it is displaceable slightly in the axial direction with respect to the inner cylinder, whereby the expansion of the core 4 can more effectively be accommodated by the corrugated portion 9. This results in a durable heat exchanger.

BEST MODE FOR CARRYING OUT THE INVENTION

An embodiment of the present invention will now be described with reference to the drawings.

Figure 1:
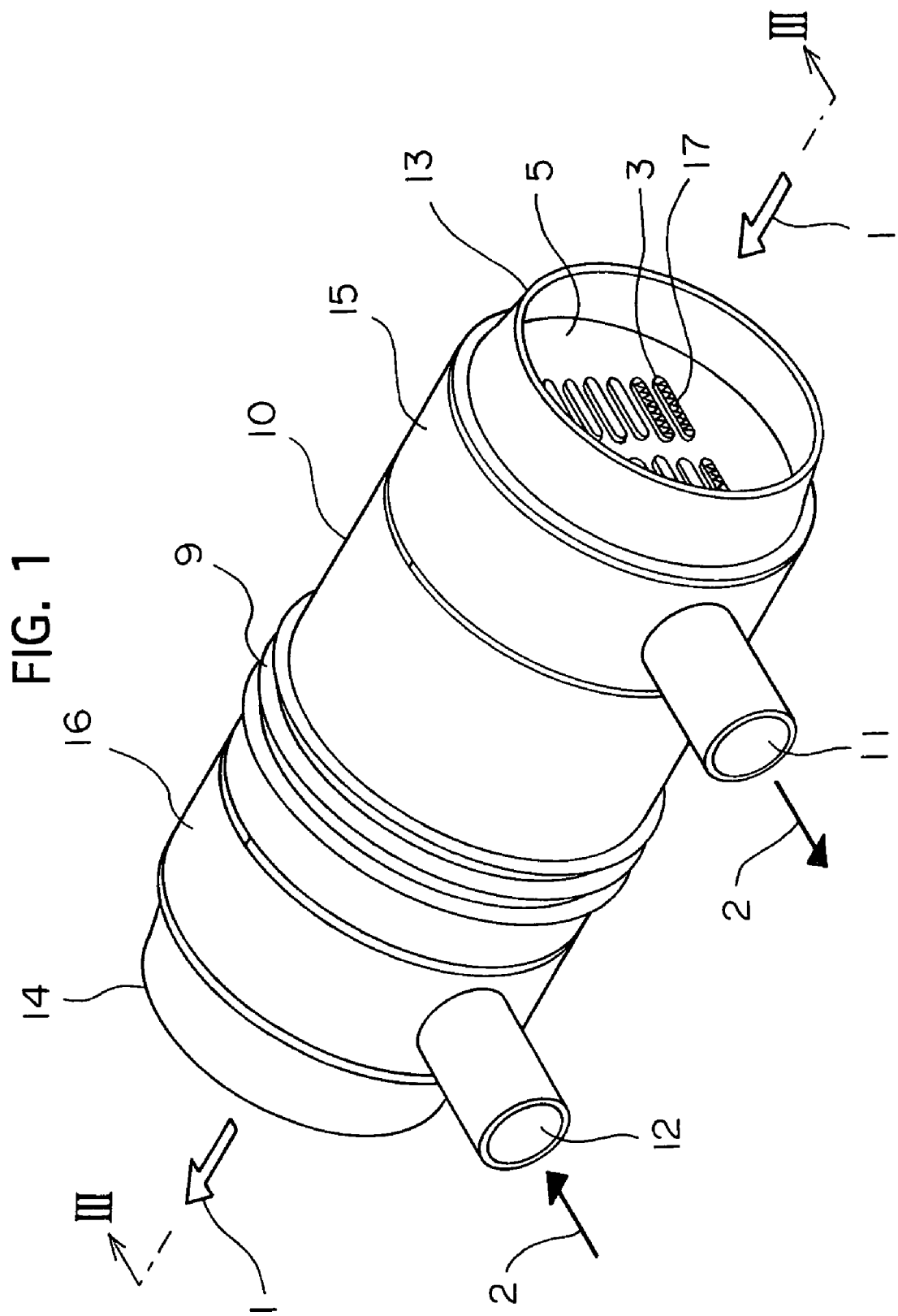
FIG. 1 is a perspective view of a heat exchanger of the present invention.
Figure 2:
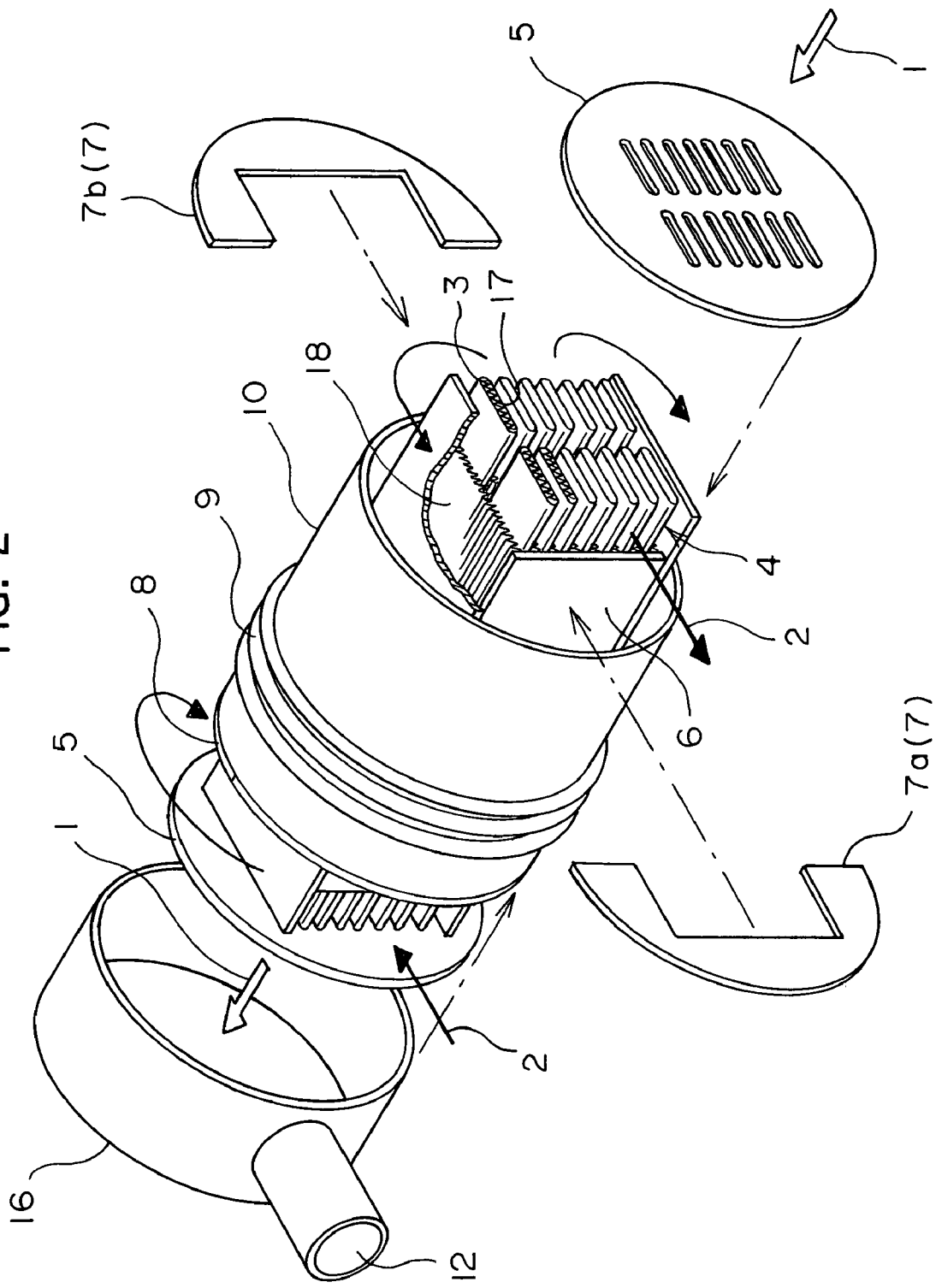
FIG. 2 is a partly cut-away exploded explanatory view of the heat exchanger.
Figure 3:
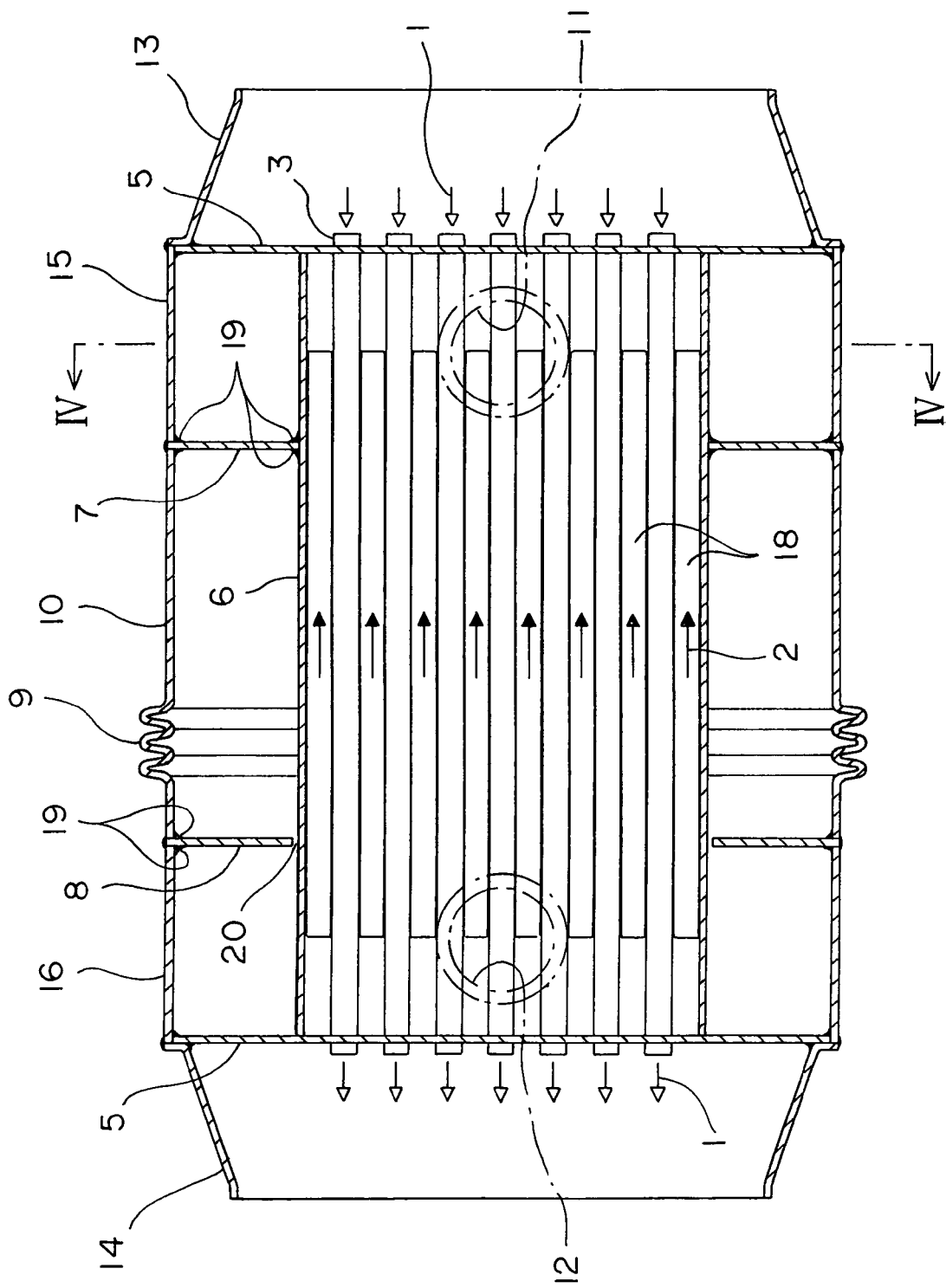
FIG. 3 is a longitudinal cross-sectional view of the heat exchanger.
Figure 4:
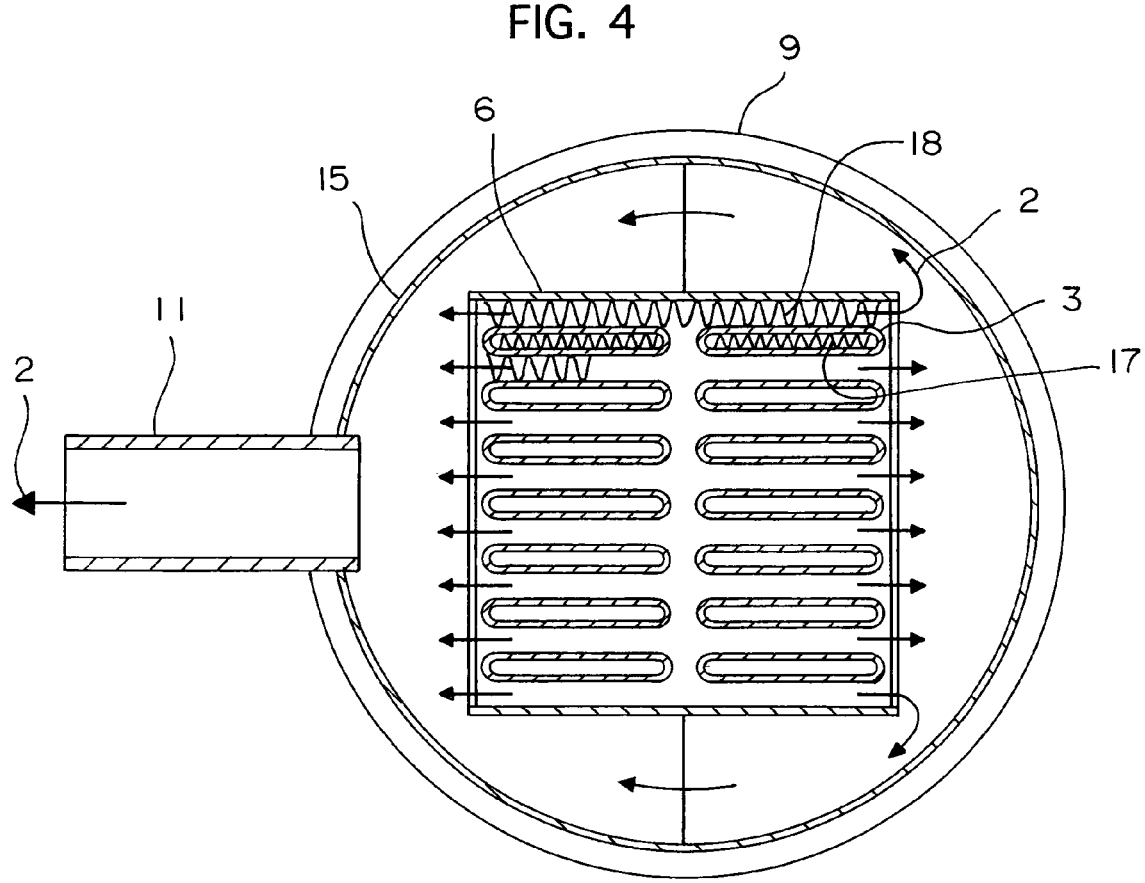
FIG. 4 is a cross-sectional view of the heat exchanger taken along line IV-IV of FIG. 3.

FIG. 1 is a perspective view of a heat exchanger of the present invention, FIG. 2 is an exploded explanatory view of the same, FIG. 3 is a longitudinal cross-sectional view of FIG. 1, and FIG. 4 is a cross-sectional view taken along line IV-IV of FIG. 3.

The heat exchanger includes a multiplicity of juxtaposed flat tubes 3 each having inner fins 17 in its interior, with outer fins 18 carrying a catalyst disposed between the adjacent flat tubes 3, to make up a core 4 in the aggregate. The flat tubes 3 are joined at their respective opposed ends to tube insertion apertures of a pair of discoidal tube plates 5 in an gas tight manner.

The outer periphery of the core 4 is covered with a square-in-section inner cylinder 6 except the vicinities of the pair of tube plate 5. The inner cylinder 6 includes two opposed side members having a length smaller than that of the flat tubes 3, and upper and lower plates having a length substantially equal to that of the flat tubes 3. This allows both end portions of the aggregate flat tubes 3 to be exposed at both extremity sides of the inner cylinder 6. The outer periphery of the inner cylinder 6 is covered with an outer cylinder 10 via a first baffle plate 7 and a second baffle plate in a pair. The outer cylinder 10 is formed into a circular cylinder having at its one end portion in the axial direction a corrugated portion 9 that is thermally expandable in the axial direction.

The first baffle plate 7 as shown in FIG. 2 consists of a pair of plate halves 7a and 7b that include rectangular openings fitted from both sides to the side members of the inner cylinder 6 at the end portions of the side members, with their joints and the inner cylinder 6 being firmly welded together in an gas tight manner as shown in FIG. 3. The outer periphery of the first baffle plate 7 and the outer cylinder 10 at its one end in the axial direction are firmly welded together in an gas tight manner over the entire periphery.

Similar to the first baffle plate 7, the second baffle plate 8 is formed of a two-segmented member whose outer periphery is firmly welded to the other end in the axial direction of the outer cylinder 10 in an gas tight manner. Between the rectangular inner periphery thereof and the outer periphery of the inner cylinder 6, however, is formed a slight gap as shown in FIG. 3, that is an unwelded portion 20.

The outer peripheries of the first baffle plate 7 and of the second baffle plate 8 and the outer peripheries of the tube plates 5 confronting the baffle plates 7 and 8 are then firmly welded to opposed ends of a first cylindrical tank 15 and of a second cylindrical tank 16 in an gas tight manner. The first tank 15 and the second tank 16 are formed with an outlet 11 and an inlet 12, respectively, as shown in FIG. 1. In this example, a pair of pipes are projectingly provided at the openings, leading to the interiors of the tanks. To the outer peripheries of the pair of tube plates 5 are joined a lead-in port 13 and a lead-out port 14 that are tapered outwardly in the axial direction, with ducts not shown for a combustion gas being connected to the extremities of the tapered ports.

In the thus constituted heat exchanger, a heating fluid 1 in the form of the combustion gas is introduced into the lead-in port 13 and moves from right to left through the interiors of the flat tubes 3. The heating fluid 1 then flows out through the lead-out port 14.

In FIG. 1, a fluid 2 to be heated in the form of a mixture of steam and hydrocarbon is introduced through the inlet 12 into the interior of the second tank 16. The fluid 2 to be heated flows through a gap defined between the leftward end of the side member and the tube plate 5 into the interior of the inner tube 6 and then moves from left to right along the outer peripheries of the flat tubes 3 and through the interiors of outer fins 18. The fluid 2 then flows into the interior of the first tank 15 defined between the first baffle plate 7 and the tube plate 5 confronting the plate 7 and is delivered via the outlet 11 to the exterior. A heat exchange is thus achieved between the heating fluid 1 and the fluid 2 to be heated, so that the fluid 2 to be heated turns to reformed gas by the action of the catalyst carried on the outer fins 18, which in turn is delivered to a power generating unit of the fuel cell.

At that time, the flat tubes 3 undergo a thermal expansion due to the high-temperature heating fluid 1 moving through the interiors of the flat tubes. This allows the corrugated portion 9 formed near the exit for the heating fluid 1 of the outer cylinder 10 to expand. In this example, by virtue of the presence of the unwelded portion 20 between the second baffle plate 8 and the inner cylinder 6, the outer cylinder 10 is capable of undergoing a smooth thermal expansion via the corrugated portion 9.

The reason for positioning the corrugated portion 9 near the exit for the heating fluid 1 is to reduce the influence of the heating fluid 1 on the corrugated portion 9 as much as possible.

It is to be noted that since a welded portion 19 provides an airtight welding between the first baffle plate 7 and the inner cylinder 6, the fluid 2 to be heated flowing in through the inlet 12 can securely be delivered uniformly to parts in the interior of the inner cylinder 6, inhibiting the fluid 2 from passing through the space defined between the inner cylinder 6 and the outer cylinder 10.

Although this heat exchanger is provided with the first baffle plate 7 and the second baffle plate 8 in a pair as shown in FIG. 3, the second baffle plate 8 may be excluded therefrom. In such a case, the outer cylinder 10 is formed integral with the second tank 16.

Figure 5:
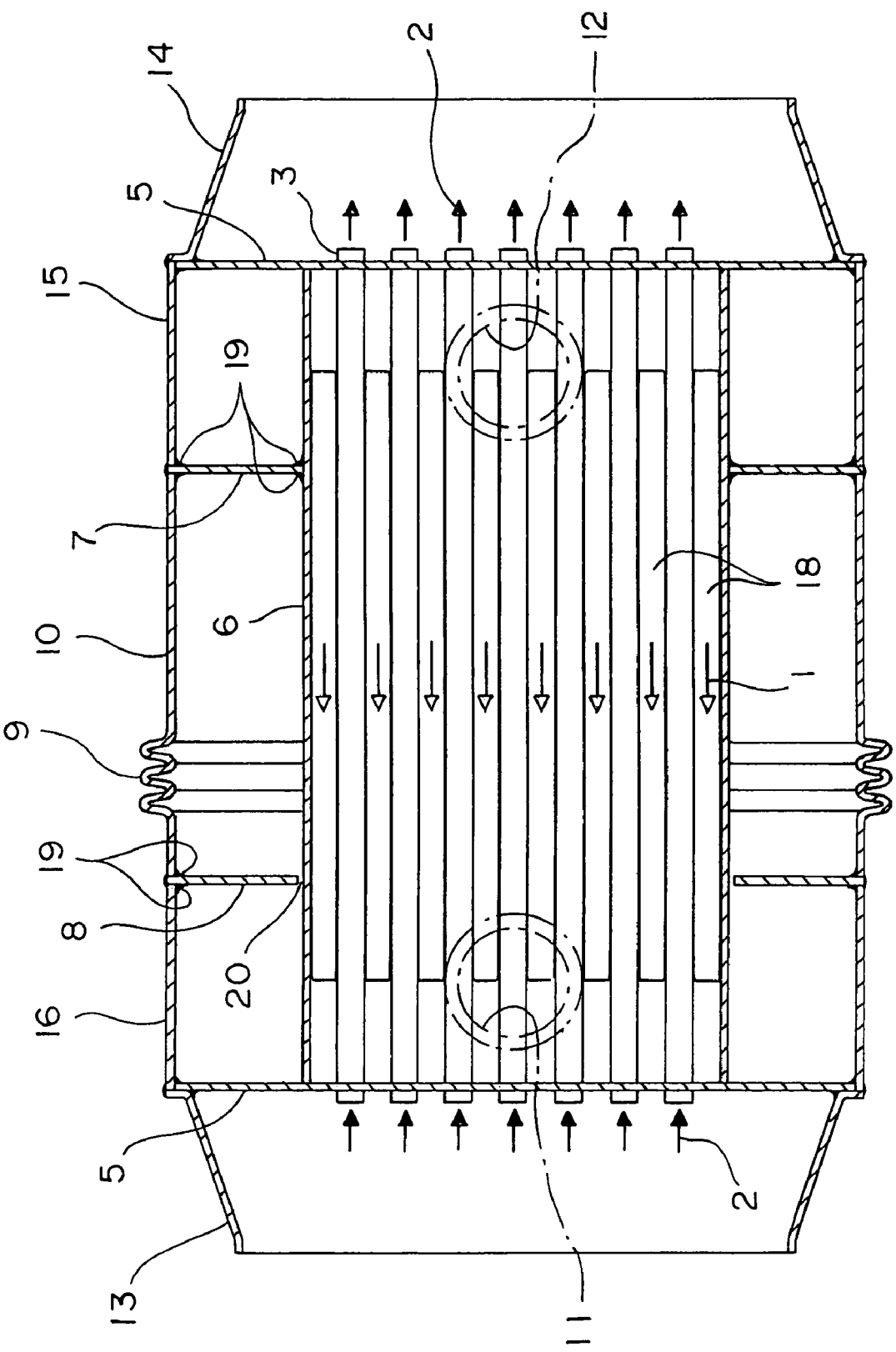
FIG. 5 is a longitudinal cross-sectional view of the heat exchanger, showing another embodiment of the present invention.

Although in the embodiment of FIGS. 1 to 4 the high-temperature heating fluid 1 is passed through the interiors of the flat tubes 3 whilst the fluid 2 to be heated is passed through the outer peripheral sides of the flat tubes 3, the flow paths of the two fluids may be inverted. More specifically, as shown in FIG. 5, the fluid 2 to be heated may flow from left to right through the interiors of the flat tubes 3 whereas the heating fluid 1 may flow from right to left through the outer peripheral sides of the flat tubes 3, to thereby achieve a heat exchange between the two fluids. In this case, the heating fluid 1 flows in through the inlet 12 on the right and flows out through the outlet 11 on the left.

The invention claimed is:

1. A heat exchanger comprising:
   a core in the aggregate of a multiplicity of juxtaposed flat tubes, with a heating fluid flowing through one of the inside and the outside of the flat tubes, with a fluid to be heated flowing through the other;
   a pair of discoidal tube plates including tube insertion apertures to which the flat tubes are joined at their respective opposed ends;
   an inner cylinder having a rectangular cross-section enclosing the outer periphery of the core except the vicinities of the pair of tube plates;
   a first baffle plate having a circular periphery fitted to the outer periphery at one end of the inner cylinder, the first baffle plate confronting one of the pair of tube plates;
   a circular outer cylinder having one end joined to the first baffle plate and the other end joined to a second baffle plate with a circular periphery disposed on the outer periphery at the other end of the inner cylinder or to the other of the pair of tube plates, the outer cylinder including on its outer periphery a corrugated portion that is thermally expandable in the axial direction; and an outlet and an inlet for the fluid to be heated or the heating fluid disposed at the both end portions of the core between the opposed ends of the inner cylinder and the pair of tube plates, wherein a lead-in port and a lead-out port for the heating fluid or the fluid to be heated are connected respectively to the pair of tube plates.

2. The heat exchanger of claim 1, wherein the second baffle plate having the circular outer periphery is fitted at its rectangular inner periphery to the outer periphery at the other end of the inner cylinder in such a manner as to be slightly displaceable in the axial direction of the inner cylinder confronting the other of the pair of tube plates, wherein the outer cylinder is firmly connected at the other end thereof to the outer periphery of the second baffle plate, wherein the first baffle plate is fitted at its rectangular inner periphery to the outer periphery at one end of the inner cylinder with the first baffle plate being secured to the outer cylinder, and wherein the heat exchanger further comprises a first and a second cylindrical tank bodies whose opposed ends are firmly connected respectively to the tube plates and to the first and the second baffle plates confronting the tube plates.

* * * * *